US011710392B2

(12) United States Patent
San Pedro et al.

(10) Patent No.: US 11,710,392 B2
(45) Date of Patent: Jul. 25, 2023

(54) TARGETED VIDEO SURVEILLANCE PROCESSING

(71) Applicant: IDEMIA National Security Solutions LLC, Alexandria, VA (US)

(72) Inventors: Marc Rene San Pedro, Alexandria, VA (US); Brian Scott Swann, Alexandria, VA (US); James Arville Loudermilk, II, Alexandria, VA (US)

(73) Assignee: IDEMIA National Security Solutions LLC, Alexandria, VA (US)

( * ) Notice: Subject to any disclaimer, the term of this patent is extended or adjusted under 35 U.S.C. 154(b) by 0 days.

(21) Appl. No.: 17/472,009

(22) Filed: Sep. 10, 2021

(65) Prior Publication Data

US 2022/0172586 A1 Jun. 2, 2022

Related U.S. Application Data

(60) Provisional application No. 63/077,393, filed on Sep. 11, 2020.

(51) Int. Cl.
*H04N 7/18* (2006.01)
*G08B 13/196* (2006.01)

(52) U.S. Cl.
CPC . *G08B 13/19615* (2013.01); *G08B 13/19652* (2013.01); *G08B 13/19671* (2013.01); *G08B 13/19691* (2013.01)

(58) Field of Classification Search
USPC ....................................................... 348/143
See application file for complete search history.

(56) References Cited

U.S. PATENT DOCUMENTS

| 7,634,662 B2 | 12/2009 | Monroe |
| 9,014,429 B2 | 4/2015 | Badawy et al. |
| 9,230,336 B2 | 1/2016 | Lewis et al. |
| 10,026,285 B2 | 7/2018 | Venetianer et al. |

(Continued)

FOREIGN PATENT DOCUMENTS

CN 107295296 A 10/2017

OTHER PUBLICATIONS

Bowyer. (2004) "Face Recognition Technology: Security versus Privacy," IEEE Technology and Society Magazine: 9-20.

(Continued)

*Primary Examiner* — Nigar Chowdhury
(74) *Attorney, Agent, or Firm* — Morrison & Foerster LLP

(57) ABSTRACT

Provided herein are systems and methods for implementing a video surveillance system. In one or more examples, the improved system can include a video managing system that applies one or more watchlists, to video footage captured by surveillance cameras to apply one or more processing policies indicated by the one or more watchlists. In some embodiments, a watchlist may indicate a plurality of events of interest (e.g., specific classes of objects, a presence of one or more persons, or one or more persons of interest, etc.) that should be detected from video footage. Through these mechanisms, video processing can be increased since the types of events of interest that need to be detected within the video footage are reduced. Non-transitory storage requirements are reduced, and human labor requirements to monitor, analyze, and review video surveillance footage is reduced.

72 Claims, 5 Drawing Sheets

(56) References Cited

U.S. PATENT DOCUMENTS

| | | |
|---|---|---|
| 2004/0146272 A1 | 7/2004 | Kessel et al. |
| 2004/0161133 A1* | 8/2004 | Elazar .............. G08B 13/19615 |
| | | 382/115 |
| 2004/0240542 A1* | 12/2004 | Yeredor ............. G08B 13/1968 |
| | | 348/169 |
| 2007/0035622 A1 | 2/2007 | Hanna et al. |
| 2011/0211070 A1 | 9/2011 | Shu |
| 2013/0166711 A1 | 6/2013 | Wang |
| 2014/0132772 A1* | 5/2014 | Billau ..................... G06F 21/00 |
| | | 348/159 |
| 2014/0133831 A1* | 5/2014 | Billau .................. G08B 19/005 |
| | | 386/262 |
| 2014/0136701 A1* | 5/2014 | Billau ............. H04N 21/21805 |
| | | 709/225 |
| 2017/0208349 A1 | 7/2017 | Saptharishi |
| 2017/0223314 A1 | 8/2017 | Collings |
| 2020/0198939 A1* | 6/2020 | Kosaka ................... B66C 13/16 |

OTHER PUBLICATIONS

Hayes. (2007) "Documenting and Understanding Everyday Activities Through The Selective Archiving of Live Experiences," [Dissertation; Georgia Institute of Technology]; 356 pages.

\* cited by examiner

TARGETED VIDEO SURVEILLANCE PROCESSING

CROSS-REFERENCE TO RELATED APPLICATIONS

This application claims the priority of U.S. Provisional Application No. 63/077,393, filed Sep. 11, 2020, the entire contents of which are incorporated herein by reference.

FIELD

The present disclosure relates generally to targeted video surveillance processing and in particular, processing video content using one or more watchlists.

BACKGROUND

Video surveillance was initially performed using closed circuit television (CCTV) and was first installed in Germany in 1942 for military purposes to observe launch of V-2 rockets during their development. Since then, video surveillance has become omnipresent and has extended to a variety of non-military applications including in banks, patient monitoring at hospitals, industrial machine monitoring, retail stores of all kinds, public and private venues with substantial traffic volumes, and increasingly in private residences. For example, video monitoring has long been used to improve security through traffic monitoring, crime reduction and deterrence, retail theft prevention, false liability claims prevention, loitering detection, prisoner monitoring, vandalism deterrence, etc.

Due to the technological improvements in digital cameras and memory storage, large volumes of high quality pictures and video can be obtained from digital cameras and stored at relatively low costs. As a result, in the past few decades, video footage has been over-collected which not only prevent efficient review of collected video, but also raises privacy concerns and encroaches on the rights of individuals captured in recorded video. Moreover, due to the higher quality pictures, an ever increasing amount of data storage is required to store video content of the same duration. For example, during the 2005 London subway bombing incident, over 6,000 hours of CCTV footage was stored. Even using computer-assisted review of the video footage has become increasing resource intensive and inefficient especially considering that the 6,000 hours of video translated into about 22 terabytes (TB) of data.

Accordingly, it is desirable to significantly reduce the amount of video footage collected as well as retained for subsequent review. It is likewise desirable to significantly reduce the labor required to review collected video footage timely following events of interest.

SUMMARY

As discussed above, current video surveillance systems over-collect video content and require significant amounts of data storage to store video footage. Therefore, there exists a need for systems and methods for targeted video surveillance processing to reduce the amounts of video footage collected as well as retained for subsequent review.

In some embodiments, an improved system can include a video managing system that applies one or more watchlists, to video footage captured by surveillance cameras to apply one or more processing policies indicated by the one or more watchlists. In some embodiments, a watchlist may indicate a plurality of events of interest (e.g., specific classes of objects, a presence of one or more persons, or one or more persons of interest, etc.) that should be detected from video footage. Through this mechanisms, video processing can be increased since the types of events of interest that need to be detected within the video footage are reduced.

In some embodiments, the video managing system can generate a plurality of video segments from the video footage and aggregate video segments that share one or more events of interest into a video cluster. Then, the video managing system can match the video cluster to one or more watchlists and apply one or more associated processing policies to the video cluster. Such a processing policy may include a referral policy related to whether and when users should be alerted to review the video cluster. The processing policy may include a retention policy related to whether video should be retained or discarded as well as retention data indicating how long video should be retained.

Through the use of watchlists, as described above, less video segments and video clusters will be retained since only certain events of interest may be detected. Additionally, the processing policies can be configured by authorized users to control which types of video content are to be retained as well as to customize a retention period. Therefore, privacy and civil liberties of non-participants can be protected in commercial collections and law enforcement can be restricted to apply video surveillance only on legally authorized surveillance targets. For example, law enforcement personnel may require a court order or a granted warrant to add individuals of interest to a watchlist.

Disclosed here in are methods for targeted video surveillance processing, comprising: receiving a video footage of an area under surveillance; analyzing the video footage using video analytics to tag a plurality of video segments of the video footage with metadata comprising one or more indicators of events of interest detected by the video analytics; generating one or more video clusters from the plurality of video segments based on the metadata for each video segment, wherein each video cluster comprises video segments having one or more indicators in common; and processing each video cluster of the one or more video clusters based on matching the one or more common indicators of each video cluster with indicators stored in a plurality of watchlists, wherein a watchlist includes a plurality of indicators for events of interest and one or more associated processing policies. In some embodiments, the one or more processing policies comprises a retention policy indicating a period of time, and wherein processing a first video cluster having one or more common first indicators comprises: matching the one or more common indicators with an indicator in the watchlist; and assigning the retention policy to the first video cluster.

Some examples of the disclosure are directed to a system for targeted video surveillance processing, comprising: one or more processors; memory comprising a local storage; and one or more programs, wherein the one or more programs are stored in the memory and configured to be executed by the one or more processors, the one or more programs including instructions for: receiving a video footage of an area under surveillance; analyzing the video footage using video analytics to tag a plurality of video segments of the video footage with metadata comprising one or more indicators of events of interest detected by the video analytics; generating one or more video clusters from the plurality of video segments based on the metadata for each video segment, wherein each video cluster comprises video segments having one or more indicators in common; and processing each video cluster of the one or more video clusters based on matching the one or more common indicators of each video cluster with indicators stored in a plurality of watchlists, wherein a watchlist includes a plurality of indicators for events of interest and one or more associated processing policies.

Some examples of the disclosure are directed to a non-transitory computer-readable storage medium comprising one or more programs for targeted video surveillance processing, wherein the one or more programs, when executed by one or more processors, cause the one or more processors to: receive a video footage of an area under surveillance; analyze the video footage using video analytics to tag a plurality of video segments of the video footage with metadata comprising one or more indicators of events of interest detected by the video analytics; generate one or more video clusters from the plurality of video segments based on the metadata for each video segment, wherein each video cluster comprises video segments having one or more indicators in common; and process each video cluster of the one or more video clusters based on matching the one or more common indicators of each video cluster with indicators stored in a plurality of watchlists, wherein a watchlist includes a plurality of indicators for events of interest and one or more associated processing policies.

Additionally or alternatively to one or more examples disclosed above, the method includes forwarding the first video cluster to a storage device configured to retain the first video cluster according to the retention policy. Additionally or alternatively to one or more examples disclosed above, the method comprises forwarding the first video cluster to a storage device configured to retain the first video cluster according to the retention policy. Additionally or alternatively to one or more examples disclosed above, the one or more processing policies comprises a storage policy indicating whether video is to be stored or discarded. Additionally or alternatively to one or more examples disclosed above, the one or more processing policies comprises a storage policy to discard video, and wherein processing a first video cluster having one or more common first indicators comprises: matching the one or more common indicators with an indicator in the watchlist; and discarding the video cluster to prevent the video cluster from being stored in a storage device. Additionally or alternatively to one or more examples disclosed above the one or more processing policies comprises a referral policy related to whether to notify a user to review video, and wherein processing a first video cluster having one or more common first indicators comprises: matching the one or more common indicators with an indicator in the watchlist; and applying the referral policy to the first video cluster. Additionally or alternatively to one or more examples disclosed above the referral policy comprises an immediate alert, a delayed alert, or no alert. Additionally or alternatively to one or more examples disclosed above the referral policy comprises an immediate alert, and wherein applying the referral policy to the first video cluster comprises: alerting a user to immediately review video content captured in the first video cluster. Additionally or alternatively to one or more examples disclosed above the referral policy comprises a delayed alert, and wherein applying the referral policy to the first video cluster comprises: assigning the delayed alert to the first video cluster; and adding the first video cluster to a group of video clusters that have been flagged by the delayed alerts for later review. Additionally or alternatively to one or more examples disclosed above the delayed alert comprises a priority level or a time period associated with the first video cluster, and wherein the group of video clusters are stored in a prioritized order based on the delayed alert. Additionally or alternatively to one or more examples disclosed above, tagging a first video segment of the plurality of video segments with metadata comprising one or more first indicators of detected events of interest comprises: generating the first video segment based on detecting an event of interest in the video footage, wherein a start of the first video segment is associated with when the event of interest was initially detected by the video analytics, and wherein an end of the first video segment corresponds to when the event of interest was no longer detected by the video analytics within a predefined period of time. Additionally or alternatively to one or more examples disclosed above, the end of the first video segment corresponds to a predetermined period of time after the event of interest was no longer detected by the video analytics. Additionally or alternatively to one or more examples disclosed above the start of the video segment corresponds to a predefined period of time before the event of interest was initially detected. Additionally or alternatively to one or more examples disclosed above analyzing the video footage using video analytics to tag a plurality of video segments of the video footage with metadata comprises: determining which watchlists from a plurality of watchlists to apply to the video footage based on a source of the video footage; and analyzing the video footage to detect one or more events of interest indicated by the determined watchlists. Additionally or alternatively to one or more examples disclosed above, the source of the video footage comprises an identifier of a security camera capturing the video footage or an identifier indicating a surveillance area being monitored by the security camera. Additionally or alternatively to one or more examples disclosed above each video cluster is associated with a unique combination of one or more indicators. Additionally or alternatively to one or more examples disclosed above, an event of interest comprises one of the following classes of objects: a presence of one or more persons within a field of view; a presence of one or more vehicles within the field of view; or a presence of one or more weapons. Additionally or alternatively to one or more examples disclosed above an event of interest comprises: a presence of one or more persons of interest. Additionally or alternatively to one or more examples disclosed above, an event of interest comprises: a presence of a vehicle characterized by a descriptor, wherein the descriptor comprises a vehicle make, a vehicle model, a license plate, a color, or a number of wheels. Additionally or alternatively to one or more examples disclosed above, an event of interest comprises: a presence of one or more persons characterized by a descriptor, wherein the descriptor comprises a height range, a hair color, a clothing color on the upper body, a clothing color on the lower body, or a hat color. Additionally or alternatively to one or more examples disclosed above, the video footage is received from an Internet protocol (IP) security camera. Additionally or alternatively to one or more examples disclosed above, tagging a first video segment with metadata comprising a first indicator of a first detected event of interest comprises: generating a confidence score indicating a likelihood that the first event of interest is accurately detected in the first video segment, and wherein the metadata comprises the confidence score associated with the first indicator. Additionally or alternatively to one or more examples disclosed above, generating the one or more video clusters from the plurality of video segments comprises: generating a video cluster to include video segments having first indicators in common and wherein a confidence level associated with each indicator in the first indicators is above a predetermined threshold value. Additionally or alternatively to one or more examples disclosed above, processing a first video cluster of video segments comprising one or more common first indicators comprises: matching the one or more common first indicators of the first video cluster with indicators stored in a plurality of watchlists to identify a first watchlist comprising the one or more common first indicators and one or more first processing policies; and determining whether to apply the one or more first processing policies to the first video cluster based on a confidence level associated with the one or more common first indicators.

BRIEF DESCRIPTION OF THE DRAWINGS

The present disclosure will now be described, by way of example only, with reference to the accompanying drawings, in which.

DETAILED DESCRIPTION

Figure 1A:
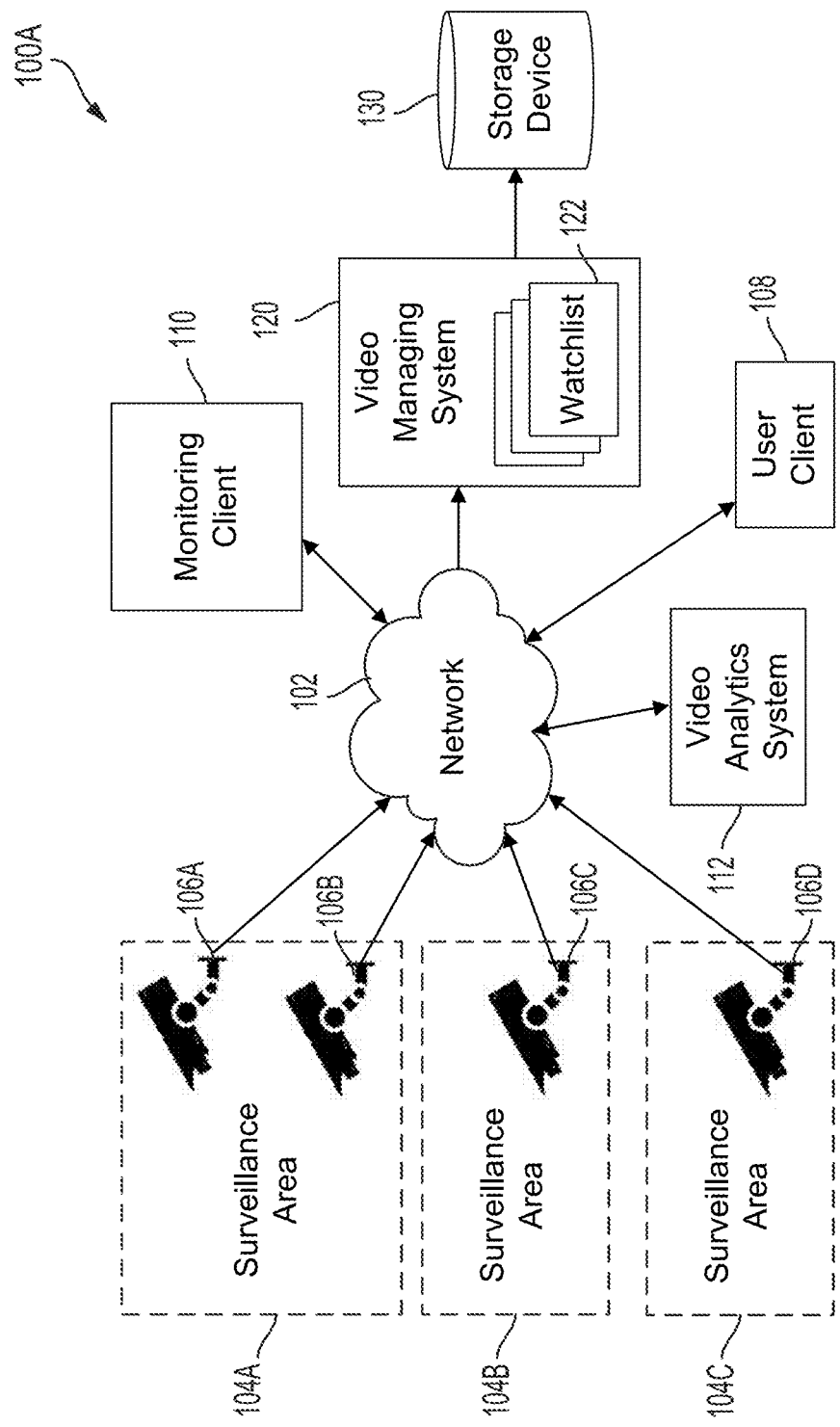
FIG. 1A illustrates a system including a video managing system for managing targeted video surveillance processing of video footage from a plurality of surveillance areas, according to some embodiments.

As discussed above, larger and larger volumes of video footage are being captured and stored. Although storage costs have dramatically decreased, it is infeasible to store ever increasing volumes of video footage. Additionally, such large volumes of video footage cannot be efficiently reviewed by users (e.g., police or security personnel). Therefore, there exists a need for a video management system that intelligently alerts the users as to which portions of the video footage need to be reviewed as well as determines which portions of video footage should be retained and for how long. In some embodiments, by selectively filtering portions of video footage to be retained or reviewed, less video footage needs to be reviewed by users and retained.

In the following description of the various embodiments, reference is made to the accompanying drawings, in which are shown, by way of illustration, specific embodiments that can be practiced. The description is presented to enable one of ordinary skill in the art to make and use the invention and is provided in the context of a patent application and its requirements. Various modifications to the described embodiments will be readily apparent to those persons skilled in the art and the generic principles herein may be applied to other embodiments. Thus, the present invention is not intended to be limited to the embodiment shown but is to be accorded the widest scope consistent with the principles and features described herein.

As used herein, the singular forms "a," "an," and "the" used in the following description are intended to include the plural forms as well unless the context clearly indicates otherwise. It is to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present invention include process steps and instructions described herein in the form of a method. It should be noted that the process steps and instructions of the present invention could be embodied in software, firmware, or hardware, and, when embodied in software, they could be downloaded to reside on, and be operated from, different platforms used by a variety of operating systems. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), field programmable gate array (FPGA), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1A illustrates a system 100A including a video managing system 120 for managing targeted video surveillance processing of video footage from a plurality of surveillance areas 104A-C, according to some embodiments. System 100A includes a plurality of security cameras 106A-D for observing surveillance areas 104A-C within a field of view of respective security cameras 106A-D. For example, security cameras 106A-B may be installed at specific locations to monitor surveillance area 104A. Likewise, security cameras 106C and 106D may be installed at specific locations to monitor surveillance areas 104B and 104C, respectively.

In some embodiments, surveillance cameras 106A-D can include a box-style security camera, a dome security camera, a pan, tilt, and zoom (PTZ) camera, a bullet security camera, a day/night security camera, a thermal security camera, or a wide-dynamic security camera. In some embodiments, as shown in system 100A, security cameras 106A-D may be IP cameras that can transmit digital signals using Internet Protocol over network 102. An IP camera may include one or more network interfaces (e.g., a wired network interface and/or a wireless network interface) to connect to network 102. In some embodiments, network 102 can include a local area network (LAN), a wide area network (WAN) such as the Internet, or a combination thereof.

In some embodiments, security cameras 106A-D can capture respective fields of view within surveillance areas 104A-C and generate video footage comprising video data representing the captured fields of view. In some embodiments, a video footage can be encoded to include a plurality of video frames and associate each video frame with a timestamp. As will be further described below, security cameras 106A-D can be configured to transmit the generated video footage to video managing system 120 through network 102. For example, the video footage may be routed to network 102 directly or through a router device or a wireless access point. In some embodiments, security cameras 106A-D may be connected to a Power over Ethernet (PoE) switch that is connected to network 102. In some embodiments, security cameras 106A-D can be configured to route video footage to video analytics system 112, whose outputs can be routed to video managing system 120.

In some embodiments, a security camera such as security camera 106A can include various hardware and/or software to capture a field of view and generate video data including analog and digital signals. For example, the security camera may include one or more image sensors such as a high-definition image sensor, a no/low light image sensor, or a specialized image sensor sensitive to spectrum ranges of light. In some embodiments, the security camera can include a video codec such as H.264, MPEG-4, MPEG-2, HEVC (H.265), etc. to compress and encode video footage for storage or for transmission to video managing system 120 over network 102. In some embodiments, the security camera may be powered through DC power such as through a Power over Ethernet (PoE) connection or through AC power via an electrical outlet. In some embodiments, the security camera can include one or more network interfaces to couple to network 102 such as, for example, an Ethernet interface, a wireless chip, a mobile communications interface, etc.

In some embodiments, video managing system 120 can be configured to receive and process one or more video footages generated by security cameras 106A-D via network 102, as will be further described below with respect to FIG. 2. In some embodiments, video managing system 120 can include one or more servers. For example, these servers may be provided by a cloud architecture to enable reliability of processing and scalability to process video footage from additional security cameras. In some embodiments, video footage can include recorded video or be a live video streamed from security cameras 106A-D to video managing system 120. Therefore, video managing system 120 may include a buffer to temporarily store a plurality of video footages while each video footage is being processed.

In some embodiments, video managing system 120 includes a plurality of watchlists 122 that control whether and how received video footage is to be processed. In some embodiments, a watchlist may include one or more events of interests represented by one or more corresponding indicators and be associated with one or more processing policies, as will be further described below with respect to FIG. 2. For example, a video segment or a video cluster whose video content matches any of the events of interest in the watchlist may be assigned with the one or more processing policies associated with the watchlist. In some embodiments, a watchlist may include a plurality of events of interest that must be matched before the video segment or the video cluster can be assigned the one or more processing policies associated with the watchlist. In some embodiments, a watchlist can include a combination of watchlists from watchlists 122. In some embodiments, one or more of watchlists 122 can associated with one or more specific security cameras or one or more specific surveillance areas. For example, a first watchlist from watchlist 122 may be assigned to surveillance area 104B such that the first watchlist should be applied to any video footage deriving from surveillance area 104B, e.g., captured by security camera 106C.

In some embodiments, video managing system 120 can include a user interface to permit a user to configure watchlists 122 through a user client 108. In some embodiments, similar to monitoring client 110, user client 108 can be provided on a user device (e.g., a tablet, a smartphone, a computer, a desktop, a smartwatch, etc.) that can connect to network 102 to access video managing system 120. In some embodiments, user client 108 may include a standalone application or a thin client downloaded on the user device. In other embodiments, the user may access user client 108 by accessing a website portal associated with video managing system 120. In various embodiments, the user may be prompted with login credentials before being permitted to configure watchlists 122. In some embodiments, video managing system 120 can further control how the user may configure watchlists 122 based on an access privilege possessed by an authenticated user.

In some embodiments, video managing system 120 can be configured to interface and communicate with video analytics system 112 to process received video footage. In some embodiments, video managing system 120 can transmit received video footage to video analytics system 112 configured to recognize and detect events of interest within one or more portions of the video footage. In some embodiments, video analytics system 112 can be configured to generate a plurality of video segments from the video footage based on which events of interest are detected within the video frames of the video footage.

In some embodiments, a video segment includes a portion of the video footage that includes video frames in which video analytics system 112 detected one or more of the same events of interest. In some embodiments, video analytics system 112 can tag the video segment with metadata including one or more indicators of the one or more events of interest detected by video analytics system 112. Accordingly, video analytics system 112 can be configured to generate a plurality of video segments which may include overlapping video content from the video footage. In some embodiments, video analytics system 112 can be configured to discard portions of the video footage in which no events of interest are detected. In some embodiments, video analytics system 112 can be configured to transmit a plurality of generated video segments tagged with a plurality of corresponding metadata to video managing system 120 via network 102.

Returning to video managing system 120, video managing system 120 can be configured to generate a plurality of clusters of video segments received from video analytics system 112 based on the metadata of the video segments, according to some embodiments. For example, video managing system 120 may aggregate a plurality of video segments sharing at least one indicator in common with a video cluster associated with the at least one indicator. In another example, video managing system 120 may aggregate a plurality of video segments sharing a plurality of specific indicators in common with a video cluster associated with that plurality of specific indicators. In some embodiments, video managing system 120 can then match one or more common indicators associated with each video cluster to indicators in watchlists 122 to identify one or more watchlists to apply to the video cluster. For example, in response to determining that the video cluster has two common indicators present in a first watchlist, video managing system 120 may process the video cluster according to the processing policies specified in the first watchlist.

In some embodiments, if the video cluster matches a plurality of watchlists having a plurality of processing policies, video managing system 120 can be configured to apply the most conservative processing policy. For example, video managing system 120 may choose to apply a retention policy having the longest retention period from a plurality of different matching retention policies. In another example, video managing system 120 may choose to apply a referral policy with the highest alert priority from a plurality of different referral policies.

In some embodiments, based on a referral policy specified in the watchlist matching a particular video cluster, video managing system 120 may generate a notification or a delayed notification to users through monitoring client 110 to review the video cluster or generate no alerts to the user. In some embodiments, based on a retention policy specified in the watchlist matching the particular video cluster, video managing system 120 can be configured to discard the video cluster and not forward the video cluster for long term retention in storage device 130. In other embodiments, video managing system 120 can transmit the video cluster to storage device 130 to be retained for a period of time indicated in the retention policy.

In some embodiments, storage device 130 can be configured to provide long term storage of video segments or video clusters of related video segments transmitted from video managing system 120 to storage device 130. As described above, the video segments or video clusters may be derived from video footage captured by security cameras 106A-D. In some embodiments, storage device 130 can include hard drives, solid state disk (SSD) drives, or be a network attached storage (NAS) system. In some embodiments, storage device 130 can be provided by one or more cloud storage devices (e.g., NAS devices) to permit mass storage of large and increasing volumes of video data.

In traditional video data storage solutions, a data storage may either be configured to store video data indefinitely until a user chooses to delete the video data or the video data may be retained for a default period of time (e.g., one or two months). In the first scenario, indefinitely storing ever increasing volumes of video data is not feasible and would continually require more storage hardware to store video data. In the second scenario, storing video data for a default period of time is inefficient since portions of video data may be of higher priority and should be retained for longer periods of time whereas other portions of video data may not need to be retained at all or can be retain for brief periods of time. In some embodiments, as described above and will be further described below with respect to FIG. 2, storage device 130 can be configured to store video clusters (or video segments) according to a retention policy determined by video managing system 120.

In some embodiments, the retention policy may include a retention date after which video is to be deleted or include a duration of time such as a number of days, weeks, months, years, etc. For example, a first video cluster may include video content showing specific persons of interest (i.e., example events of interest) and may be assigned a first retention policy of, for example, 3 years. In another example, a second video cluster may include video content showing movement of one or more detected persons (i.e., example events of interest) and may be assigned a second retention policy of, for example, 9 months. In the second example, the second video cluster may not need to be retained for as long as the first video cluster because users are less likely to need long term surveillance of all persons in contrast to surveillance of specific persons of investigative interest.

In some embodiments, system 100A includes a monitoring client 110 that permits a user to review portions of video footage authorized for review by video managing system 120. In some embodiments, monitoring client 110 can include a central monitoring station or a user device (e.g., a laptop, a computer, a workstation, a smartphone, a tablet, etc.) that can connect to network 102 to access video managing system 120. In some embodiments, monitoring client 110 may include a standalone application or a thin client downloaded on the user device. In other embodiments, the user may access monitoring client 110 by accessing a website portal associated with video managing system 120. In various embodiments, the user may be prompted with login credentials before being permitted to review portions of video footage authorized for review. In some embodiments, as described above, video managing system 120 may assign an immediate alert to a video cluster. In these embodiments, video managing system 120 can be configured to generate and send the immediate alert to the user through monitoring client 110 to notify the user to perform immediate video review. In other embodiments, video managing system 120 may assign a delayed alert to a video cluster. In these embodiments, video managing system 120 may store video clusters assigned to the delayed alert. The user may review these stored video clusters at a subsequent time via monitoring client 110. In some embodiments, users may be permitted to review portions of video footage (e.g., video clusters) stored in storage device 130 using monitoring client 110.

Figure 1B:
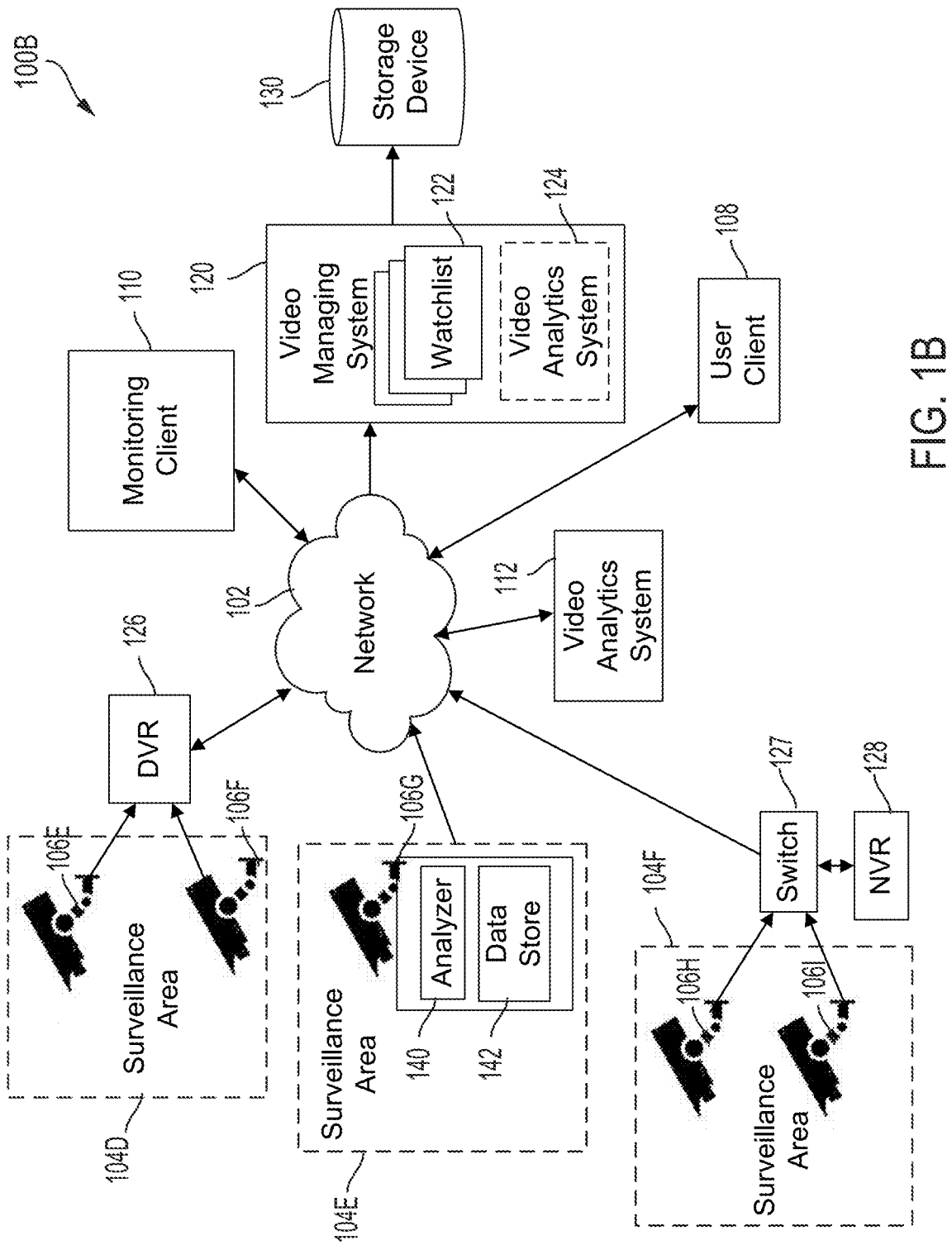
FIG. 1B illustrates a system including a video managing system for managing targeted video surveillance processing of video footage from a plurality of surveillance areas, according to some embodiments.

FIG. 1B illustrates a system 100B including a video managing system 120 for managing targeted video surveillance processing of video footage from a plurality of surveillance areas 104D-F, according to some embodiments. System 100B shows many of the same components as those described above with respect to system 100A of FIG. 1A. In contrast to system 100A, however, system 100B shows that video managing system 120 can be configured to process video footage captured by other types of surveillance cameras 106E-I.

In some embodiments, in addition to security cameras 106A-D which are IP cameras escribed with respect to FIG. 1A, video managing system 120 can be configured to process video footage captured by an analog camera system such as analog cameras 106E-F (also referred to as closed-circuit television (CCTV) cameras) monitoring surveillance area 104D. In these embodiments, analog cameras 106E-F can be physically coupled to a digital video recorder (DVR) 126 through respective cables (e.g., coaxial cables). In some embodiments, DVR 126 can be configured to convert the analog video captured by analog cameras 106E-F into digital video footage. In some embodiments, DVR 126 can be coupled to network 102 through a network device (e.g., a router, a switch, etc.) and configured to transmit the digital video footage to video managing system 120 for further processing. In some embodiments, video footage captured by analog cameras 106E-F can be temporarily buffered in DVR 126, whereas the video footage transmitted to video managing system 120 may be stored in storage device 130 for longer periods of time depending on whether certain criteria are met, as described above with respect to FIG. 1A. For example, the video footage stored in DVR 126 may be stored for a default period of time (e.g., 8 hours, 1 day, 1 week, etc.) that permits DVR 126 enough time to offload the video footage to video managing system 120. In some embodiments, DVR 126 can be configured to store the captured video footage on its internal storage device until the video footage is forwarded to video managing system 120, after which the video footage may be deleted or marked for deletion.

In some embodiments, in addition to or alternative to security cameras 106A-D described with respect to FIG. 1A, video managing system 120 can be configured to process video footage captured by edge video devices such as edge camera 106G. Edge camera 106G can be an IP camera co-located with video analytics capabilities and optionally data storage functionality. For example, edge camera 106G may include an analyzer 140 configured to provide near real-time video analytic functionality including some or all of those provided by video analytics system 112, as described above with respect to FIG. 1A. Like video analytics system 112, analyzer 140 may be configured to analyze the video footage to determine whether one or more video segments include one or more events of interest as well as tag indicators to each video segment to indicate detected events of interest. In some embodiments, edge camera 106G can store one or more of watchlists 122 specific to edge camera 106G or surveillance area 104E and the one or more stored watchlists may indicate the one or more events of interest to be detected. In some embodiments, analyzer 140 can then transmit a plurality of video segments and associated one or more indicators to video managing system 120 for further processing. In some embodiments, analyzer 140 can also perform some or all of the functionality as that provide by video managing system 120 and described above. In these embodiments, analyzer 140 can generate clusters of video segments, match video clusters to one or more watchlists 122 stored locally on edge camera 106, and process a video cluster according to the one or more processing policies in a watchlist matching the video cluster.

For example, as described above with respect to FIG. 1A, a watchlist may include one or more classes of objects or one or more specific objects or persons. The watchlist may also include one or more processing policies such as a retention policy and/or a review policy. In response to analyzer 140 determining that, for example, a video segment or a cluster of video segments meets a predefined criteria (e.g., matches the watchlist), analyzer 140 may alert a user through monitoring client 110 based on the review policy and/or transmit the video segment or video cluster over network 102 for long term storage depending on the retention policy associated with the watchlist.

In some embodiments, video footage captured by edge camera 106G can be stored in data store 142. For example, a plurality of video segments of the video footage may be temporarily buffered in data store 142 while analyzer 140 runs video analytics on each video segment. In some embodiments, data store 142 may be configured to store the video segments for a default period of time (e.g., 8 hours, 1 day, 3 days, 1 week, etc.). In some embodiments, once analyzer 140 finishes processing a video segment, analyzer 140 can be configured to delete the video segment from data store 142 or to mark the video segment for deletion.

In some embodiments, the types of analytics functionality as well as available processing speed of edge camera 106G may depend on power, heat dissipation, and size/weight constraints of edge camera 106G. One advantage of edge camera 106G is that unlike IP cameras such as security cameras 106A-D, edge camera 106G does not need to be continuously connected to network 102 to route captured video footage to video managing system 120 for further processing. In some embodiments, analyzer 140 on edge camera 106G can perform fine grained filtering based on one or more watchlists or perform a first filtering step to reduce the amount of video footage that is transferred over to network 102 to be further processed by video managing system 120.

In some embodiments, in addition to or alternative to security cameras 106A-D described with respect to FIG. 1A, video managing system 120 can be configured to process video footage captured by IP cameras 106H-I that are not directly connected to network 102. In some embodiments, IP cameras 106H-I may be directly connected to a network video recorder (NVR) 128 or indirectly connected to NVR 128 through switch 127. For example, IP cameras 106H-I may be connected to NVR 128 through a wired connection (e.g., Ethernet cables) or a wireless connection (e.g., WiFi). In some embodiments, switch 127 may include a power-over-Ethernet (PoE) switch that provides both power and data communication to IP cameras 106H-I.

In some embodiments, NVR 128 can be configured to record video footage captured by IP cameras 106H-I and store captured video footage. In some embodiments, like DVR 126, NVR 128 can be configured to forward stored video footage to video managing system 120 for further processing. For example, NVR 128 may transmit the video footage via a router connected to switch 127. In some embodiments, NVR 128 may function as temporary storage for captured video footage, whereas video footage transmitted to video managing system 120 may be retained for long term storage on storage device 130 depending on whether certain criteria are met, as described above with respect to FIG. 1A. For example, NVR 128 may store captured video footage for a short period of time (e.g., 1 hour, 8 hours, 1 day, etc.) whereas video footage stored on storage device 130 can be retained for much longer periods of time (e.g., 6 months, 9 months, 1 year, 7 years, etc.). In some embodiments, NVR 128 can be configured to store the captured video footage on its internal storage device until the video footage is forwarded to video managing system 120, after which the video footage may be deleted or marked for deletion.

In some embodiments, functions provided by video analytics system 112 may be implemented by video managing system 120. For example, video managing system 120 may include a video analytics system 124 which may correspond to video analytics system 112. In some embodiments, video analytics system 124 may include one or more objects databases or face databases to permit video analytics system 124 to detect classes of objects or motion, specific objects or persons, or a combination thereof.

Figure 2:
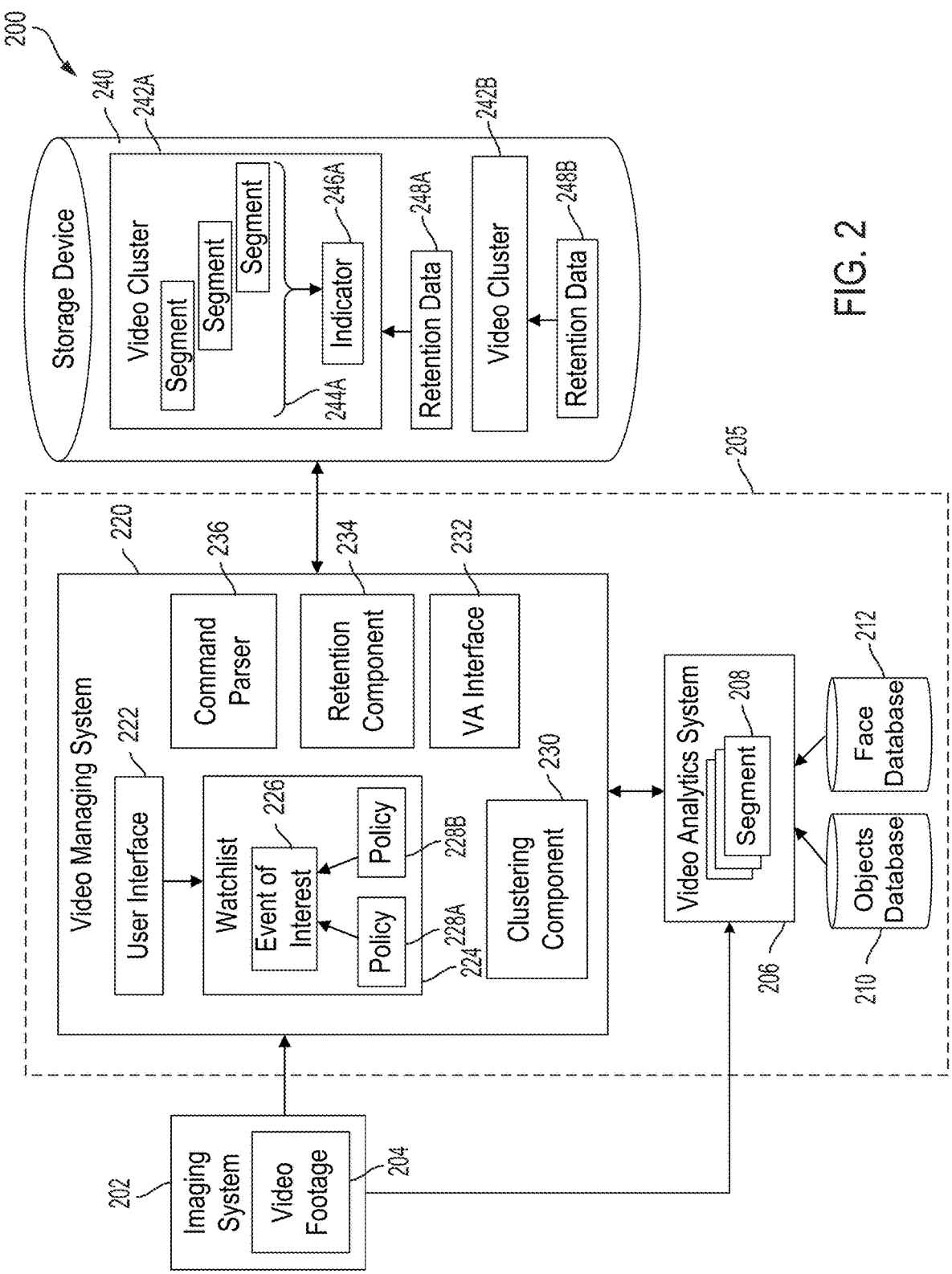
FIG. 2 illustrates a block diagram of a system for targeted video surveillance processing, according to some embodiments.

FIG. 2 illustrates a block diagram of a system 200 for targeted video surveillance processing, according to some embodiments. System 200 includes an imaging system 202, a video analytics system 206, a video managing system 220, and a storage device 240. In some embodiments, video managing system 220, video analytics system 206, and storage device 240 may correspond to video managing system 120, video analytics system 112, and storage device 130, respectively. In some embodiments, as described above with respect to FIG. 1B, video managing system 220 and video analytics system 206 can be implemented in an integrated video managing system 205.

In some embodiments, imaging system 202 can include one or more security cameras such as security cameras 106A-D or security cameras 106E-I as described above in FIGS. 1A and 1B, respectively. For example, imaging system 202 may include an IP camera configured to communicate with video managing system 205 through an IP network. In some embodiments, imaging system 202 can include a surveillance network of security cameras. In some embodiments, a security camera in imaging system 202 can generate video footage 204 that includes video content captured within a field of view of an area under surveillance by the security camera. In some embodiments, video footage 204 can be stored in a video format to represent a plurality of video frames tagged by metadata such as timestamps indicating when the video content was captured. Accordingly, video footage 204 can include a plurality of video frames.

In some embodiments, video footage 204 can be stored and transmitted according to one or more video formats such as H.264, MJPEG, MPEG-4, MPEG-2, HEVC (H.265), etc. In some embodiments, imaging system 202 can be configured to transmit video footage 204 to video managing system 220 or video analytics system 206 through a network (e.g., network 102 of FIG. 1A). In some embodiments, video footage 204 can be transmitted as a live video stream in real time or near real time. In other embodiments, video footage 204 can be transmitted as recorded video, as described above with respect to security cameras 106A-I in FIGS. 1A-B.

In some embodiments, video managing system 220 receiving video footage 204 can be configured to request video analytics system 206 to parse video footage 204 into a plurality of video segments 208. For example, video managing system 220 may forward the received video footage 204 to video analytics system 206 through a network (e.g., network 102). In other embodiments, video footage 204 may be directly transmitted to video analytics system 206 for processing.

In some embodiments, video analytics system 206 can be configured to generate a plurality of video segments 208 based on the received video footage 204 such that each video segment includes related video content. In some embodiments, video analytics system 206 can be configured to apply video analytics to detect one or more events of interest within video footage 204 and generate a video segment of video frames that are detected to include the one or more events of interest. In some embodiments, each video segment include a plurality of video frames within a predefined period of time that include one or more events of interest in common as detected by video analytics system 206. In some embodiments, video analytics system 206 can be configured to detect events of interests in the video frames of video footage 204 based on a plurality of watchlists supplied by video managing system 220.

In some embodiments, as shown in video managing system 220, a watchlist 224 can include one or more events of interest such as event of interest 226 that is associated with one or more processing policies 228A-B. As will be further described below, processing policies 228A-B include information that controls how video content that contains event of interest 226 should be processed. For example, processing policies 228A-B may control whether the video content should be referred to users for immediate review, whether the video content can be retained on storage device 240 for long term storage, and if so, for how long the video content should be retained on storage device 240.

In some embodiments, watchlist 224 can include one or more classes of objects or object motion. For example, event of interest 226 may include a presence or motion within a field of view of the following: one or more persons, one or more vehicles, one or more aircraft, one or more busses, one or more trucks, one or more bicycles, one or more weapons, luggage, one or more backpacks, one or more hats, etc. In other examples, event of interest 226 may be a class of motion or activities such as a running person, bending down, a falling person, etc.

In some embodiments, watchlist 224 can include one or more specific objects or activities within a field of view. For example, event of interest 226 may include a specific vehicle identified by a license plate, a specific type of weapon, a person performing a specific activity or motion, etc. In some embodiments, event of interest 226 can include one or more specific persons of interest. In these embodiments, reference images of a person of interest may need to be supplied by the user.

In some embodiments, watchlist 224 can include one or more objects or persons characterized by one or more descriptors. For example, event of interest 226 may indicate one or more vehicles of a specific make, model, color, or a combination thereof, each of which are example descriptors. In another example, event of interest 226 may indicate one or more persons meeting criteria required by one or more descriptors. In these example, the one or more descriptors for persons may include a designated hat color, a hair color, upper garment type or color, lower garment type or color, a height range, a gender, accessories like glasses or rings, a tattoo, etc. In some embodiments, watchlist 224 effectively can act as a filter on captured video content such that only video content that includes the characteristics of unknown persons of interest are retained and subsequently forwarded to authorized users for manual review.

In some embodiments, watchlist 224 can include a whitelist or a blacklist. In some embodiments, the whitelist includes a plurality of events of interest whose captured video content should be retained or referred for review. For example, in a public or national security context, the whitelist may include a plurality of individuals of investigative interest. For example, common whitelists may include the Terrorist Screening Centers Terrorist Watchlist, the State Department's Arms Export Control Act (AECA) Debarred List and U.S. Denied Persons List, the FBI's Ten Most Wanted List, or Wanted Persons listed maintained by the FBI for whom open judicial warrants exist. In other contexts such as at fundraising events in politics, sports, or at universities, a whitelist may include prominent donors or family members of these donors which fundraisers may be particularly interested in tracking. In yet other contexts such as in a commercial context, the whitelist may include a list of VIP customers or important personnel that should be tracked.

In contrast, a blacklist may include a plurality of events of interest whose captured video content should not be retained, according to some embodiments. For example, in a commercial context, the blacklist may include employees expected to be regularly present at surveilled locations and whose image as captured by security cameras should not be retained. In a residential context such as at an apartment complex, security personnel may be concerned with protecting privacy of residents and may generate the blacklist of residents at the apartment complex such that video content captured of residents do not require review nor storage. In this context, security guards are more concerned with monitoring unknown persons, which may be indicated in a whitelist.

Accordingly, video analytics system 206 can run video analytics on one or more video frames of video footage 204 to generate a plurality of video segments 208 based on events of interests identified in one or more watchlists including, for example, watchlist 224. As described above, an event of interest may include a presence or motion of a class of objects such as persons, vehicles, weapons, etc. The event of interest may also include a presence or motion of a specific type of object or persons characterized by one or more descriptors or specific objects or persons of interest. For example, such an event of interest may include a red vehicle, a vehicle with a specific license plate, a particular make or model of vehicle, etc.

In some embodiments, video analytics system 206 can be configured to implement one or more object detection algorithms to detect one or more events of interest including a presence of a class of objects or specific objects within video frames of video footage 204. In some embodiments, an object detection algorithm can include one or more machine learning algorithms such as Convolution Neural Networks (CNNs), Region-based CNN (R-CNN), Fast R-CNN, Faster R-CNN, You Only Look Once (YOLO), etc. In some embodiments, reference images for objects or extracted features for objects can be stored in objects database 210. In some embodiments, video analytics system 206 can run one or more object detection algorithms to generate feature results and compare the feature results with those stored in objects database 210 to detect a class of objects or a specific object.

In some embodiments, video analytics system 206 can be configured to implement one or more facial recognition algorithms to detect a presence of one or more persons or to detect one or more specific persons of interest within video frames of video footage 204. In some embodiments, the one or more facial recognition algorithms can be configured to detect faces, extract features from a detected face, and match the extracted features to a face database 212 of face features to identify one or more specific persons. In some embodiments, the one or more facial recognition algorithms can include one or more machine learning algorithms such as those described above for object detection and/or principal component analysis (PCA) using eigenfaces, linear discriminant analysis (LDA), elastic bunch graph matching using the Fisherface algorithm, a hidden Markov model, multilinear subspace learning using tensor representation, neuronal motivated dynamic link matching, or a combination of two or more algorithms. In some embodiments, video analytics system 206 can be configured to train one or more of its machine learning algorithms based on a plurality of reference images of a person of interest to permit detection of that person in one or more video frames of video footage 204.

In some embodiments, video analytics system 206 can be configured to apply one or more object recognition or facial recognition algorithms on video footage 204 to segment video footage 204 into a plurality of video segments 208. In some embodiments, each video segment can include a plurality of video frames that have been determined by video analytics system 206 to include an event of interest. In these embodiments, video analytics system 206 can be configured to tag the video segment with metadata indicating presence of the detected event of interest. In some embodiments, the metadata may include one or more indicators for one or more detected events of interest and one or more corresponding confidence scores.

In some embodiments, during review of video footage 204, video analytics system 206 can initiate a start of a video segment associated with an event of interest in response to detecting the event of interest in the video footage 204. In some embodiments, while the event of interest is detected in following video frames of video footage 204 within a predetermined period of time, additional video frames may be added to the video segment. In some embodiments, video analytics system 206 can determine an end of the video segment in response to determining that the event of interest has not been detected in video footage 204 within a period of time. In some embodiments, to add buffer time to the video segment, video analytics system 206 an be configured to add one or more time buffers so that the delimited video segment begins a first period of time (e.g., minutes) before the event of interest is detected and ends a second period of time (e.g., minutes) after the event of interest is no longer being detected.

In some embodiments, object and facial recognition algorithms operate on a probabilistic basis and provide a confidence score (e.g., 80%) for each indicator of a detected event of interest indicating how likely that event of interest was accurately classified or detected. As described above, an event of interest may indicate a presence of a class of objects or specific objects or persons of interest. Therefore, a video segment that is tagged with three indicators for three detected events of interest may be tagged with three corresponding confidence scores. In this example, the three indicators may include a first indicator of presence of one or more persons detected in the video segment, a second indicator of a presence of a specific person of interest detected in the video segment, and a third indicator of a presence of one or more weapons detected in the video segment. In some embodiments, video analytics system 206 can be configured to tag each of video segments 208 with one or more indicators having a confidence score above a predefined threshold value. In other words, video analytics system 206 may be configured to filter video segments from being transmitted to video management system 220 depending on whether the confidence score is above a predefined threshold value.

In some embodiments, video managing system 220 can be configured to perform targeted video surveillance processing of video footage 204 based on one or more watchlists such as watchlist 224. In some embodiments, to process video footage 204, video managing system 220 can include a user interface 222, a clustering component 230, a video analytics (VA) interface 232, a retention component 234, and a command parser 236. In some embodiments, video managing system 220 can be implemented on one or more servers centrally located or distributed across a network. In other embodiments, video managing system 220 can be implemented on one or more cloud servers in a cloud platform.

In some embodiments, VA interface 232 is configured to communicate with video analytics system 206. For example, video managing system 220 may receive video footage 204 from imaging system 204 and VA interface 232 may route video footage 204 to one or more video analytics systems such as video analytics system 206. In some embodiments, VA interface 232 can then receive video segments 208 tagged with metadata as generated by video analytics system 208. In some embodiments, VA interface 232 can be configured to transfer a copy of a plurality of watchlists to video analytics system 206 to control which types of events of interest video analytics system 206 is to detect. As described above, watchlists such as watchlist 224 include a plurality of events of interest such as event of interest 226. In some embodiments in which an integrated video managing system 205 includes video analytics system 206, VA interface 232 may be an optional component.

In some embodiments, user interface 222 can be configured to permit authorized users to access or configure watchlist 224 stored on video managing system 220. In some embodiments, user interface 222 can be provided as a web application or a web portal to the user who can access user interface 222 through a user device capable of connecting to a network (e.g., the Internet) accessed by video managing system 220. In some embodiments, user interface 222 can prompt a user to enter login credentials to authenticate the user before permitting access to watchlist 224 or to view video content stored on storage device 240. In some embodiments, user interface 222 can be configured to restrict how the user can interact with watchlist 224 based on an access privilege possessed by the user. For example, user interface 222 may permit a first user having a read-only access to view event of interest 226 and associated processing policies 228A-B, but does not permit any changes to watchlist 224. In another example, user interface 222 may permit a second user having a limited access to assign a restricted set of processing policies to events of interest. In another example, user interface 222 may permit a third user having unlimited access to add, delete, or update watchlists, event of interest 226 in watchlist 226, and/or processing policies 228A-B assigned to event of interest 226. In some embodiments, in certain surveillance scenarios, the unlimited access may be granted to a user based on a court order or warrant.

In some embodiments, clustering component 230 can be configured to generate a plurality of clusters of related video segments from video segments 208 received from video analytics system 206. In some embodiments, clustering component 230 can be configured to aggregate a plurality of video segments that have one or more indicators in common into a video cluster. For example, clustering component 230 may compare metadata between video segments 208 to determine which video segments have one or more indicators in common. In some embodiments, each video cluster can be associated with a unique combination of a plurality of indicators. Therefore, it is possible for two video clusters to include the same video segment if that video segment is tagged with one or more indicators contained in both of the two video clusters.

In some embodiments, command parser 236 can be configured to match a video cluster generated by clustering component 230 with one or more watchlists including watchlist 224 to determine how to process the video cluster of video segments. In some embodiments, command parser 236 can be configured to determine that the video cluster matches watchlist 224 in response to determining that the one or more indicators of the video cluster matches one or more events of interest such as event of interest 226 in watchlist 224. In some embodiments, a watchlist may require that a plurality of events of interest be matched before the video cluster can be matched to the watchlist. In some embodiments, command parser 236 can process the video cluster that matches event of interest 226 based on one or more processing policies 228A-B. In some embodiments, one or more processing policies 228A-B can be assigned to specific events of interest such as event of interest 226. In other embodiments, the one or more processing policies 228A-B can be assigned to one or more watchlists such as watchlist 224.

In some embodiments, as described above with respect to FIG. 1A, one or more processing policies 228A-B may include a referral policy, a retention policy, or a combination thereof. For example, the referral policy may indicate that the video content be referred to human analyst immediately (i.e., an immediate alert), flagged for later review (i.e., a delayed alert), or not alerted at all. For example, the retention policy may indicate whether the video content is authorized for retention and should be retained or deleted. In an example, the retention policy may indicate a period of time (e.g., a number of days, weeks, months, years, etc.) to retain video content in storage device 240. In an example, the retention policy may indicate a retention date to retain the video content in storage device 240, after which the video content should be deleted.

In some embodiments, retention component 234 can be configured to manage retention and deletion of video content stored in storage device 240. In some embodiments, retention component 234 can be configured to periodically, on demand, or requested by storage device 240 to check the retention policy (e.g., retention data 246A-B) of video content (e.g., video clusters 242A-B) storage device 240 to determine whether to delete or request storage device 240 to delete video content.

In some embodiments, storage device 240 can correspond to storage device 130 of FIG. 1A. Like storage device 130, storage device 240 can be configured to provide long term storage of video content. In some embodiments, storage device 240 can receive video clusters and associated retention policies from video management system 220. Then, storage device 240 may store the received video clusters 242A-B in association with respective retention data 248A-B controlling how long each video cluster is to be retained in storage device 240. As shown in storage device 240, video cluster 242A can include a plurality of segments 244A that meet the same criteria as shown as indicator 246A. In some embodiments, segments 244A can include a plurality of indicators. An indicator may correspond to a detected event of interest as specified in one or more watchlists 226. In some embodiments, storage device 240 can be configured to delete a video cluster, e.g., video cluster 242A, whose retention data 248A indicates that video cluster 242A should not be retained any longer.

Figure 3:
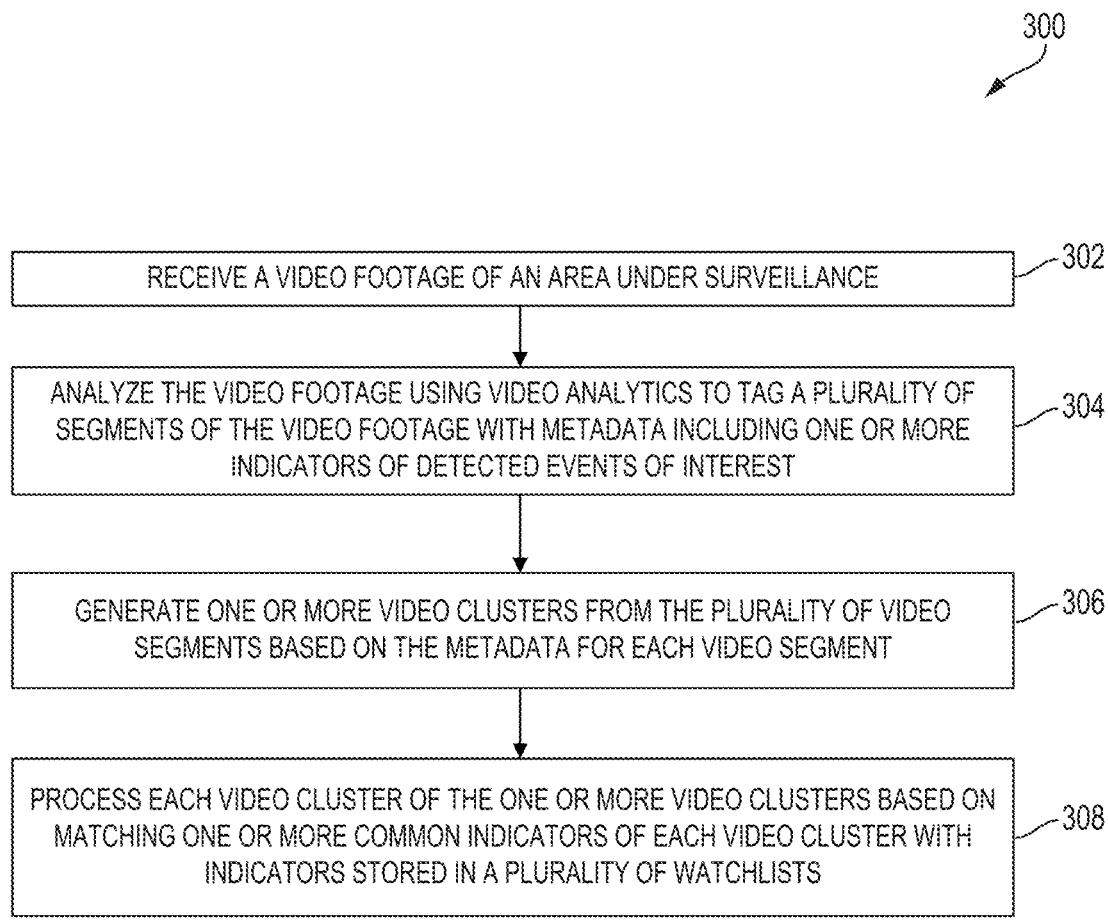
FIG. 3 illustrates a flowchart of a method for targeted video surveillance processing, according to some embodiments.

FIG. 3 illustrates a flowchart of a method 300 for targeted video surveillance processing, according to some embodiments. Method 300 can be performed by a video managing system such as video managing system 120 of FIGS. 1A-B.

In step 302, the video managing system receives a video footage of an area under surveillance. For example, the video footage may be captured by a security camera such as security cameras 106A-D of FIG. 1 or 106E-I of FIG. 2. In some embodiments, the video footage may include a live video stream or a video recording. In some embodiments, the video footage can be encoded to represent a plurality of video frames each including associated metadata. For example, a video frame may include a timestamp associated with the video frame. In some embodiments, metadata assigned to the video footage may include information related to a source of the video footage. For example, the metadata may include a type or an ID of the surveillance camera, an indicator of the surveillance area, or a combination thereof.

In step 304, the video managing system analyzes the video footage using video analytics to tag a plurality of video segments of the video footage with metadata including one or more indicators of events of interest detected by the video analytics. In some embodiments, the video managing system can be configured to request a video analytics system (e.g., video analytics system 112) separate from the video managing system to analyze the video footage. For example, the video managing system may transmit the video footage to the video analytics system. In other embodiments, the video managing system can implement a video analytics system (e.g., video analytics system 124) to run the video analytics.

In some embodiments, the events of interest may include a presence or motion of a class of objects. For example, classes of objects may include persons, a type of animal, one or more vehicles, a type of vehicle, weapons, etc. In some embodiments, the events of interest may include a presence or motion of an object characterized by one or more descriptors. For example, the one or more descriptors for a vehicle (i.e., an example object) may include a model, a make, a color, a specific license plate, etc. In another example, the one or more descriptors for persons (i.e., example objects) may include a hair color, a height range, a skin color, a gait, wearing of glasses, upper garment color, lower garment color, wearing of a hat of a specific color, etc. In some embodiments, the events of interest may include a presence or motion of a specific person. For example, the specific person may be identified by a name or one or more reference pictures identifying that specific person. As described above with respect to FIG. 1A, a watchlist of specific persons have a wide array of practical utility including at banks, retail stores, prisons, etc.

In some embodiments, the video managing system can be configured to determine which events of interests to detect from the video footage based on metadata received with the video footage. For example, each surveillance area may be associated with a plurality of watchlists. In another example, each surveillance camera may be associated with one or more watchlists. Accordingly, the video managing system may retrieve one or more watchlists to be applied to the video footage based on the metadata assigned to the video footage. Then, the video managing system may detect only events of interest indicated in the one or more retrieved watchlists. In some embodiments, limiting the number of events of interest to detect significantly speeds up the video analytics.

In step 306, the video managing system generates one or more video clusters from the plurality of video segments based on the metadata for each video segment. In some embodiments, each video cluster includes video segments having one or more indicators in common. Therefore, a single video segment may be included in multiple video clusters depending on which events of interest are detected in that video segment. In some embodiments, each video cluster is associated with a unique combination of one or more indicators.

In some embodiments, the video managing system can be configured to segment the video footage into a plurality of video segments based on which events of interest are detected in the video footage. In some embodiments, while parsing and analyzing the video footage, the video managing system can initiate the creation of a first video segment in response to detecting the presence of a first event of interest. Once the first event of interest is no longer detected within a predetermined period of time, the video managing system can end the first video segment. Thereafter, the video managing system can tag the first video segment with a first indicator representing that the first event of interest was detected in the first video segment.

In some embodiments, the video managing system can execute one or more object detection or facial detection algorithms to detect the first event of interest. In these embodiments, the video managing system can be configured to generate a confidence score indicating a likelihood that the first event was accurately detected in the first video segment. Then, the video managing system can associate the confidence score with the first indicator.

In step 308, the video managing system processes each video cluster of the one or more video clusters based on matching the one or more common indicators of each video cluster with indicators stored in a plurality of watchlists, wherein a watchlist includes a plurality of indicators for events of interest and one or more associated processing policies. In some embodiments, a processing policy includes programming commands that control how the video managing system should process a video cluster.

In some embodiments, a processing policy includes a review policy indicating whether video should be reviewed. In some embodiments, the review policy may include an immediate alert, no alert, or a delayed alert. For example, the immediate alert may be to notify a user that video content in the video cluster includes an event of interest matching a watchlist having the review policy of an immediate alert. For example, such a watchlist may be for VIP customers in a retail context or high-risk individuals such as criminals or terrorists in a security context. For example, no alert may be to allow the video segment to be stored based on a retention policy without notifying the user of the storage. In some embodiments, the delayed alert may be to wait a predetermined amount of time (e.g., 10 minutes, 1 hour, etc.) before notifying the user of the match for further review. In some embodiments, the delayed alert may include a priority level or a timestamp that allows video clusters assigned delayed alerts to be ranked for further review by the user.

In some embodiments, a processing policy includes a retention policy indicating whether video are authorized for retention on a storage device (e.g., storage device 130) for long term storage. In some embodiments, a watchlist may include a blacklist of events of interest associated with a retention policy to discard video. For example, in a retail context or at a residential property, the blacklist may include individuals such as employees or residents, respectively, whose captured video should not be recorded and retained not only to protect their privacy, but also to reduce the amount of video that need to be stored. In the retail and residential contexts, users are more concerned about monitoring trespassers or third parties. In such embodiments, if the video managing system matches a first video cluster having a first common indicator with an indicator in the blacklist, then the video managing system may be configured to discard or delete the first video cluster and prevent the first video cluster from being forwarded to the storage device.

In some embodiments, the retention policy includes information indicating how long video should be retained on the storage device. In some embodiments, the information may relate to a period of time (e.g., 30 days, 90 days, 3 months, 6 months, 9 months, 1 year, 3 years, 9 years, indefinitely, etc.). In some embodiments, the information may relate to a date after which video may no longer need to be retained and can be deleted from the storage device. In some embodiments, the video managing system can assign the retention policy to a first video cluster matching a watchlist associated with the retention policy. Then, the video managing system can transmit the first video cluster with the retention policy to the storage device for long term. In some embodiments, the storage device can be configured to store and retain the received first video cluster according to the received retention policy. In some embodiments, the review and/or retention includes indication that video segments should begin a specified period prior to an event of interest, and also may extend a specified period following the termination of an event of interest.

In some embodiments, the video managing system provides a user interface that permits authorized users to add or update a plurality of watchlists. In some embodiments, the video managing system can be configured to control which processing policies an authorized user can add to a watchlist based on an access privilege of the user. For example, a first user may possess a first access privilege (e.g., a read-only access) to view a watchlist and that does not permit the first user to change processing policies associated with the watchlist. In another example, a second user may possess a second access privilege (e.g., a security personnel access) that permits the second user to change, for example, a referral policy or a retention policy associated with a watchlist of events of interest permitted to be retained. In another example, a third user may possess a third access privilege (e.g., court-authorized access) that permits the third user to change a processing policy related to whether video of certain events of interest (e.g., specific persons) can be captured and retained. Otherwise, in some scenarios, a default processing policy may be to discard video to protect privacy of individuals captured in the video footage.

In some embodiments, the user interface can permit authorized users to assign one or more watchlists to a surveillance area or a specific security camera. Accordingly, the video managing system permits custom watchlists to be selectively applied to different surveillance areas and/or security cameras.

Figure 4:
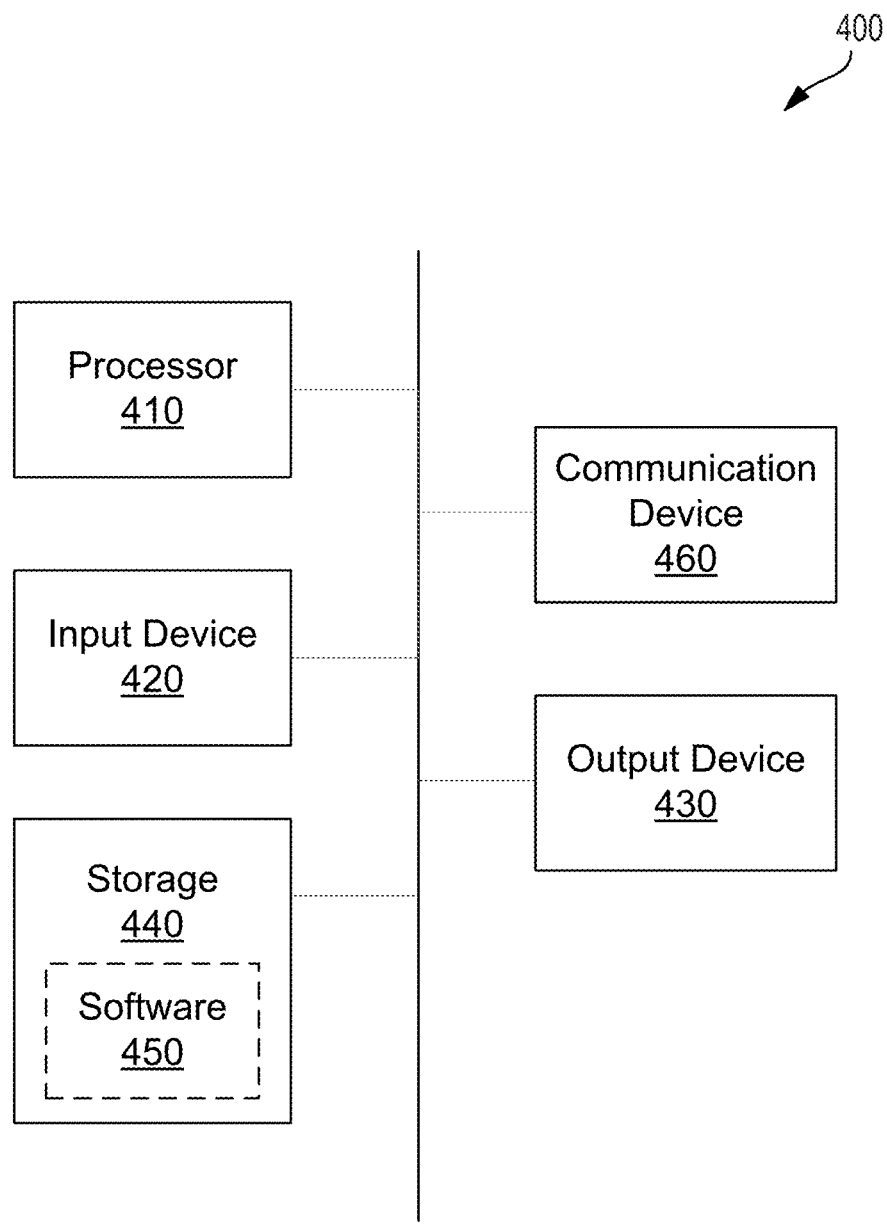
FIG. 4 illustrates an example of a computer, according to some embodiments.

FIG. 4 illustrates an example of a computing device 400, according to some embodiments. Device 400 can be a host computing device connected to a network. For example, device 400 may be an example implementation of one or more of the devices or systems described above with respect to FIGS. 1A-B and 2. Device 400 can be a client computer or a server. As shown in FIG. 4, device 400 can be any suitable type of microprocessor-based device, such as a personal computer, work station, or server. The device can include, for example, one or more of processor 410, input device 420, output device 430, storage 440, and communication device 460. Input device 420 and output device 430 can generally correspond to those described above and can either be connectable or integrated with the computing device.

Input device 420 can be any suitable device that provides input, such as a touchscreen, keyboard or keypad, mouse, or voice-recognition device. Output device 430 can be any suitable device that provides output, such as a touchscreen, haptics device, or speaker.

Storage 440 can be any suitable device that provides storage, such as an electrical, magnetic, or optical memory including a RAM, cache, hard drive, or removable storage disk. Communication device 460 can include any suitable device capable of transmitting and receiving signals over a network, such as a network interface chip or device. The components of the computing device can be connected in any suitable manner, such as via a physical bus, or wirelessly.

Software 450, which can be stored in storage 440 and executed by processor 410, can include, for example, the programming that embodies the functionality of the present disclosure (e.g., as embodied in the devices described above). For example, software 450 may include system software (e.g., an operating system), application software, or security software.

Software 450 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 440, that can contain or store programming for use by or in connection with an instruction-execution system, apparatus, or device.

Software 450 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 400 can implement any operating system suitable for operating on the network. Software 450 can be written in any suitable programming language, such as C, C++, Java, or Python. In various embodiments, application software embodying the functionality of the present disclosure can be deployed in different configurations, such as in a client/server arrangement, for example.

The foregoing description, for purpose of explanation, has made reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments, with various modifications, that are suited to the particular use contemplated.

Although the disclosure and examples have been fully described with reference to the accompanying figures, it is to be noted that various changes and modifications will be apparent to those skilled in the art. Such changes and modifications are to be understood as being included within the scope of the disclosure and examples as defined by the claims.

What is claimed is:

1. A method for targeted video surveillance processing, comprising:
    receiving a video footage of an area under surveillance;
    analyzing the video footage using video analytics to tag a plurality of video segments of the video footage with metadata comprising one or more indicators of events of interest detected by the video analytics;
    generating one or more video clusters from the plurality of video segments based on the metadata tagged for each video segment, wherein each video cluster comprises video segments having one or more indicators in common; and
    processing each video cluster of the one or more video clusters based on matching the one or more common indicators of each video cluster with indicators stored in a plurality of watchlists, wherein a watchlist includes a plurality of indicators for events of interest and one or more associated processing policies.

2. The method of claim 1, wherein the one or more processing policies comprises a retention policy indicating a period of time, and wherein processing a first video cluster having one or more common first indicators comprises:
    matching the one or more common indicators with an indicator in the watchlist; and
    assigning the retention policy to the first video cluster.

3. The method of claim 2, comprising:
    forwarding the first video cluster to a storage device configured to retain the first video cluster according to the retention policy.

4. The method of claim 1, wherein the one or more processing policies comprises a storage policy indicating whether video is to be stored or discarded.

5. The method of claim 4, wherein the one or more processing policies comprises a storage policy to discard video, and wherein processing a first video cluster having one or more common first indicators comprises:
    matching the one or more common indicators with an indicator in the watchlist; and
    discarding the video cluster to prevent the video cluster from being stored in a storage device.

6. The method of claim 1, wherein the one or more processing policies comprises a referral policy related to whether to notify a user to review video, and wherein processing a first video cluster having one or more common first indicators comprises:
    matching the one or more common indicators with an indicator in the watchlist; and
    applying the referral policy to the first video cluster.

7. The method of claim 6, wherein the referral policy comprises an immediate alert, a delayed alert, or no alert.

8. The method of claim 6, wherein the referral policy comprises an immediate alert, and wherein applying the referral policy to the first video cluster comprises:
    alerting a user to immediately review video content captured in the first video cluster.

9. The method of claim 6, wherein the referral policy comprises a delayed alert, and wherein applying the referral policy to the first video cluster comprises:
    assigning the delayed alert to the first video cluster; and
    adding the first video cluster to a group of video clusters that have been flagged by the delayed alerts for later review.

10. The method of claim 9, wherein the delayed alert comprises a priority level or a time period associated with the first video cluster, and wherein the group of video clusters are stored in a prioritized order based on the delayed alert.

11. The method of claim 1, wherein tagging a first video segment of the plurality of video segments with metadata comprising one or more first indicators of detected events of interest comprises:
    generating the first video segment based on detecting an event of interest in the video footage, wherein a start of the first video segment is associated with when the event of interest was initially detected by the video analytics, and wherein an end of the first video segment corresponds to when the event of interest was no longer detected by the video analytics within a predefined period of time.

12. The method of claim 11, wherein the end of the first video segment corresponds to a predetermined period of time after the event of interest was no longer detected by the video analytics.

13. The method of claim 11, wherein the start of the video segment corresponds to a predefined period of time before the event of interest was initially detected.

14. The method of claim 1, wherein analyzing the video footage using video analytics to tag a plurality of video segments of the video footage with metadata comprises:
    determining which watchlists from a plurality of watchlists to apply to the video footage based on a source of the video footage; and
    analyzing the video footage to detect one or more events of interest indicated by the determined watchlists.

15. The method of claim 14, wherein the source of the video footage comprises an identifier of a security camera capturing the video footage or an identifier indicating a surveillance area being monitored by the security camera.

16. The method of claim 1, wherein each video cluster is associated with a unique combination of one or more indicators.

17. The method of claim 1, wherein an event of interest comprises one of the following classes of objects:
    a presence of one or more persons within a field of view;
    a presence of one or more vehicles within the field of view; or
    a presence of one or more weapons.

18. The method of claim 1, wherein an event of interest comprises: a presence of one or more persons of interest.

19. The method of claim 1, wherein an event of interest comprises: a presence of a vehicle characterized by a descriptor, wherein the descriptor comprises a vehicle make, a vehicle model, a license plate, a color, or a number of wheels.

20. The method of claim 1, wherein an event of interest comprises: a presence of one or more persons characterized by a descriptor, wherein the descriptor comprises a height range, a hair color, a clothing color on the upper body, a clothing color on the lower body, or a hat color.

21. The method of claim 1, wherein the video footage is received from an Internet protocol (IP) security camera.

22. The method of claim 1, wherein tagging a first video segment with metadata comprising a first indicator of a first detected event of interest comprises:
    generating a confidence score indicating a likelihood that the first event of interest is accurately detected in the first video segment, and wherein the metadata comprises the confidence score associated with the first indicator.

23. The method of claim 22, wherein generating the one or more video clusters from the plurality of video segments comprises:
generating a video cluster to include video segments having first indicators in common and wherein a confidence level associated with each indicator in the first indicators is above a predetermined threshold value.

24. The method of claim 22, wherein processing a first video cluster of video segments comprising one or more common first indicators comprises:
matching the one or more common first indicators of the first video cluster with indicators stored in a plurality of watchlists to identify a first watchlist comprising the one or more common first indicators and one or more first processing policies; and
determining whether to apply the one or more first processing policies to the first video cluster based on a confidence level associated with the one or more common first indicators.

25. A system for targeted video surveillance processing, comprising:
one or more processors;
memory comprising a local storage; and
one or more programs, wherein the one or more programs are stored in the memory and configured to be executed by the one or more processors, the one or more programs including instructions for:
receiving a video footage of an area under surveillance;
analyzing the video footage using video analytics to tag a plurality of video segments of the video footage with metadata comprising one or more indicators of events of interest detected by the video analytics;
generating one or more video clusters from the plurality of video segments based on the metadata tagged for each video segment, wherein each video cluster comprises video segments having one or more indicators in common; and
processing each video cluster of the one or more video clusters based on matching the one or more common indicators of each video cluster with indicators stored in a plurality of watchlists, wherein a watchlist includes a plurality of indicators for events of interest and one or more associated processing policies.

26. The system of claim 25, wherein the one or more processing policies comprises a retention policy indicating a period of time, and wherein processing a first video cluster having one or more common first indicators comprises:
matching the one or more common indicators with an indicator in the watchlist; and
assigning the retention policy to the first video cluster.

27. The system of claim 26, wherein the programs include instructions for:
forwarding the first video cluster to a storage device configured to retain the first video cluster according to the retention policy.

28. The system of claim 25, wherein the one or more processing policies comprises a storage policy indicating whether video is to be stored or discarded.

29. The system of claim 28, wherein the one or more processing policies comprises a storage policy to discard video, and wherein processing a first video cluster having one or more common first indicators comprises:
matching the one or more common indicators with an indicator in the watchlist; and
discarding the video cluster to prevent the video cluster from being stored in a storage device.

30. The system of claim 25, wherein the one or more processing policies comprises a referral policy related to whether to notify a user to review video, and wherein processing a first video cluster having one or more common first indicators comprises:
matching the one or more common indicators with an indicator in the watchlist; and
applying the referral policy to the first video cluster.

31. The system of claim 30, wherein the referral policy comprises an immediate alert, a delayed alert, or no alert.

32. The system of claim 30, wherein the referral policy comprises an immediate alert, and wherein applying the referral policy to the first video cluster comprises:
alerting a user to immediately review video content captured in the first video cluster.

33. The system of claim 30, wherein the referral policy comprises a delayed alert, and wherein applying the referral policy to the first video cluster comprises:
assigning the delayed alert to the first video cluster; and
adding the first video cluster to a group of video clusters that have been flagged by the delayed alerts for later review.

34. The system of claim 33, wherein the delayed alert comprises a priority level or a time period associated with the first video cluster, and wherein the group of video clusters are stored in a prioritized order based on the delayed alert.

35. The system of claim 25, wherein tagging a first video segment of the plurality of video segments with metadata comprising one or more first indicators of detected events of interest comprises:
generating the first video segment based on detecting an event of interest in the video footage, wherein a start of the first video segment is associated with when the event of interest was initially detected by the video analytics, and wherein an end of the first video segment corresponds to when the event of interest was no longer detected by the video analytics within a predefined period of time.

36. The system of claim 35, wherein the end of the first video segment corresponds to a predetermined period of time after the event of interest was no longer detected by the video analytics.

37. The system of claim 35, wherein the start of the video segment corresponds to a predefined period of time before the event of interest was initially detected.

38. The system of claim 25, wherein analyzing the video footage using video analytics to tag a plurality of video segments of the video footage with metadata comprises:
determining which watchlists from a plurality of watchlists to apply to the video footage based on a source of the video footage; and
analyzing the video footage to detect one or more events of interest indicated by the determined watchlists.

39. The system of claim 38, wherein the source of the video footage comprises an identifier of a security camera capturing the video footage or an identifier indicating a surveillance area being monitored by the security camera.

40. The system of claim 25, wherein each video cluster is associated with a unique combination of one or more indicators.

41. The system of claim 25, wherein an event of interest comprises one of the following classes of objects:
a presence of one or more persons within a field of view;
a presence of one or more vehicles within the field of view; or
a presence of one or more weapons.

42. The system of claim 25, wherein an event of interest comprises: a presence of one or more persons of interest.

43. The system of claim 25, wherein an event of interest comprises: a presence of a vehicle characterized by a descriptor, wherein the descriptor comprises a vehicle make, a vehicle model, a license plate, a color, or a number of wheels.

44. The system of claim 25, wherein an event of interest comprises: a presence of one or more persons characterized by a descriptor, wherein the descriptor comprises a height range, a hair color, a clothing color on the upper body, a clothing color on the lower body, or a hat color.

45. The system of claim 25, wherein the video footage is received from an Internet protocol (IP) security camera.

46. The system of claim 25, wherein tagging a first video segment with metadata comprising a first indicator of a first detected event of interest comprises:
generating a confidence score indicating a likelihood that the first event of interest is accurately detected in the first video segment, and wherein the metadata comprises the confidence score associated with the first indicator.

47. The system of claim 46, wherein generating the one or more video clusters from the plurality of video segments comprises:
generating a video cluster to include video segments having first indicators in common and wherein a confidence level associated with each indicator in the first indicators is above a predetermined threshold value.

48. The system of claim 46, wherein processing a first video cluster of video segments comprising one or more common first indicators comprises:
matching the one or more common first indicators of the first video cluster with indicators stored in a plurality of watchlists to identify a first watchlist comprising the one or more common first indicators and one or more first processing policies; and
determining whether to apply the one or more first processing policies to the first video cluster based on a confidence level associated with the one or more common first indicators.

49. A non-transitory computer-readable storage medium comprising one or more programs for targeted video surveillance processing, wherein the one or more programs, when executed by one or more processors, cause the one or more processors to:
receive a video footage of an area under surveillance;
analyze the video footage using video analytics to tag a plurality of video segments of the video footage with metadata comprising one or more indicators of events of interest detected by the video analytics;
generate one or more video clusters from the plurality of video segments based on the metadata tagged for each video segment, wherein each video cluster comprises video segments having one or more indicators in common; and
process each video cluster of the one or more video clusters based on matching the one or more common indicators of each video cluster with indicators stored in a plurality of watchlists, wherein a watchlist includes a plurality of indicators for events of interest and one or more associated processing policies.

50. The non-transitory computer-readable storage medium of claim 49, wherein the one or more processing policies comprises a retention policy indicating a period of time, and wherein processing a first video cluster having one or more common first indicators comprises:
matching the one or more common indicators with an indicator in the watchlist; and
assigning the retention policy to the first video cluster.

51. The non-transitory computer-readable storage medium of claim 50, wherein the one or more processors are caused to:
forward the first video cluster to a storage device configured to retain the first video cluster according to the retention policy.

52. The non-transitory computer-readable storage medium of claim 49, wherein the one or more processing policies comprises a storage policy indicating whether video is to be stored or discarded.

53. The non-transitory computer-readable storage medium of claim 52, wherein the one or more processing policies comprises a storage policy to discard video, and wherein processing a first video cluster having one or more common first indicators comprises:
matching the one or more common indicators with an indicator in the watchlist; and
discarding the video cluster to prevent the video cluster from being stored in a storage device.

54. The non-transitory computer-readable storage medium of claim 49, wherein the one or more processing policies comprises a referral policy related to whether to notify a user to review video, and wherein processing a first video cluster having one or more common first indicators comprises:
matching the one or more common indicators with an indicator in the watchlist; and
applying the referral policy to the first video cluster.

55. The non-transitory computer-readable storage medium of claim 54, wherein the referral policy comprises an immediate alert, a delayed alert, or no alert.

56. The non-transitory computer-readable storage medium of claim 54, wherein the referral policy comprises an immediate alert, and wherein applying the referral policy to the first video cluster comprises:
alerting a user to immediately review video content captured in the first video cluster.

57. The non-transitory computer-readable storage medium of claim 54, wherein the referral policy comprises a delayed alert, and wherein applying the referral policy to the first video cluster comprises:
assigning the delayed alert to the first video cluster; and
adding the first video cluster to a group of video clusters that have been flagged by the delayed alerts for later review.

58. The non-transitory computer-readable storage medium of claim 57, wherein the delayed alert comprises a priority level or a time period associated with the first video cluster, and wherein the group of video clusters are stored in a prioritized order based on the delayed alert.

59. The non-transitory computer-readable storage medium of claim 49, wherein tagging a first video segment of the plurality of video segments with metadata comprising one or more first indicators of detected events of interest comprises:
generating the first video segment based on detecting an event of interest in the video footage, wherein a start of the first video segment is associated with when the event of interest was initially detected by the video analytics, and wherein an end of the first video segment corresponds to when the event of interest was no longer detected by the video analytics within a predefined period of time.

60. The non-transitory computer-readable storage medium of claim 59, wherein the end of the first video segment corresponds to a predetermined period of time after the event of interest was no longer detected by the video analytics.

61. The non-transitory computer-readable storage medium of claim 59, wherein the start of the video segment corresponds to a predefined period of time before the event of interest was initially detected.

62. The non-transitory computer-readable storage medium of claim 49, wherein analyzing the video footage using video analytics to tag a plurality of video segments of the video footage with metadata comprises:
   determining which watchlists from a plurality of watchlists to apply to the video footage based on a source of the video footage; and
   analyzing the video footage to detect one or more events of interest indicated by the determined watchlists.

63. The non-transitory computer-readable storage medium of claim 62, wherein the source of the video footage comprises an identifier of a security camera capturing the video footage or an identifier indicating a surveillance area being monitored by the security camera.

64. The non-transitory computer-readable storage medium of claim 49, wherein each video cluster is associated with a unique combination of one or more indicators.

65. The non-transitory computer-readable storage medium of claim 49, wherein an event of interest comprises one of the following classes of objects:
   a presence of one or more persons within a field of view;
   a presence of one or more vehicles within the field of view; or
   a presence of one or more weapons.

66. The non-transitory computer-readable storage medium of claim 49, wherein an event of interest comprises: a presence of one or more persons of interest.

67. The non-transitory computer-readable storage medium of claim 49, wherein an event of interest comprises: a presence of a vehicle characterized by a descriptor, wherein the descriptor comprises a vehicle make, a vehicle model, a license plate, a color, or a number of wheels.

68. The non-transitory computer-readable storage medium of claim 49, wherein an event of interest comprises: a presence of one or more persons characterized by a descriptor, wherein the descriptor comprises a height range, a hair color, a clothing color on the upper body, a clothing color on the lower body, or a hat color.

69. The non-transitory computer-readable storage medium of claim 49, wherein the video footage is received from an Internet protocol (IP) security camera.

70. The non-transitory computer-readable storage medium of claim 49, wherein tagging a first video segment with metadata comprising a first indicator of a first detected event of interest comprises:
   generating a confidence score indicating a likelihood that the first event of interest is accurately detected in the first video segment, and wherein the metadata comprises the confidence score associated with the first indicator.

71. The non-transitory computer-readable storage medium of claim 70, wherein generating the one or more video clusters from the plurality of video segments comprises:
   generating a video cluster to include video segments having first indicators in common and wherein a confidence level associated with each indicator in the first indicators is above a predetermined threshold value.

72. The non-transitory computer-readable storage medium of claim 70, wherein processing a first video cluster of video segments comprising one or more common first indicators comprises:
   matching the one or more common first indicators of the first video cluster with indicators stored in a plurality of watchlists to identify a first watchlist comprising the one or more common first indicators and one or more first processing policies; and
determining whether to apply the one or more first processing policies to the first video cluster based on a confidence level associated with the one or more common first indicators.

* * * * *